US010970630B1

(12) United States Patent
Aimone et al.

(10) Patent No.: US 10,970,630 B1
(45) Date of Patent: Apr. 6, 2021

(54) NEUROMORPHIC COMPUTING ARCHITECTURE WITH DYNAMICALLY ACCESSIBLE CONTEXTS

(71) Applicants: National Technology & Engineering Solutions of Sandia, LLC, Albuquerque, NM (US); Lewis Rhodes Labs, Inc., Concord, MA (US)

(72) Inventors: James Bradley Aimone, Albuquerque, NM (US); John H. Naegle, Albuquerque, NM (US); Jonathon W. Donaldson, Albuquerque, NM (US); David Follett, Concord, MA (US); Pamela Follett, Concord, MA (US)

(73) Assignees: National Technology & Engineering Solutions of Sandia, LLC, Albuquerque, NM (US); Lewis Rhodes Labs, Inc., Concord, MA (US)

( * ) Notice: Subject to any disclaimer, the term of this patent is extended or adjusted under 35 U.S.C. 154(b) by 792 days.

(21) Appl. No.: 15/624,271

(22) Filed: Jun. 15, 2017

(51) Int. Cl.
   *G06N 3/08* (2006.01)
   *G06N 3/04* (2006.01)
(52) U.S. Cl.
   CPC ............. *G06N 3/08* (2013.01); *G06N 3/04* (2013.01)
(58) Field of Classification Search
   CPC .................................. G06N 3/08; G06N 3/04
   See application file for complete search history.

(56) References Cited

U.S. PATENT DOCUMENTS

| | | | |
|---|---|---|---|
| 8,909,576 B2 | 12/2014 | Akopyan et al. | |
| 9,275,328 B1* | 3/2016 | Minkovich | G06N 3/088 |
| 9,563,599 B2 | 2/2017 | Follett et al. | |
| 2007/0022063 A1* | 1/2007 | Lightowler | G06N 3/063 706/15 |
| 2015/0019468 A1* | 1/2015 | Nugent | G06N 3/063 706/25 |
| 2015/0106310 A1* | 4/2015 | Birdwell | G06N 3/086 706/20 |
| 2015/0294217 A1 | 10/2015 | Aparicio, IV | |
| 2015/0324685 A1 | 11/2015 | Bohn et al. | |
| 2018/0189638 A1* | 7/2018 | Nurvitadhi | G06N 3/063 |
| 2019/0114557 A1* | 4/2019 | Ashrafi | G06T 1/20 |
| 2019/0200888 A1* | 7/2019 | Poltorak | G16H 20/70 |
| 2019/0236444 A1* | 8/2019 | Cassidy | G06N 3/063 |
| 2019/0266481 A1* | 8/2019 | Amir | G06N 3/049 |
| 2020/0349422 A1* | 11/2020 | Tran | G11C 27/005 |

* cited by examiner

*Primary Examiner* — Brandon S Cole
(74) *Attorney, Agent, or Firm* — Medley, Behrens & Lewis, LLC

(57) ABSTRACT

Various technologies pertaining to allocating computing resources of a neuromorphic computing system are described herein. Subgraphs of a neural algorithm graph to be executed by the neuromorphic computing system are identified. The subgraphs are each executed by a group of neuron circuits serially. Output data generated by execution of the subgraphs are provided to the same or a second group of neuron circuits at a same time or with associated timing data indicative of a time at which the output data was generated. The same or second group of neuron circuits performs one or more processing operations based upon the output data.

17 Claims, 8 Drawing Sheets

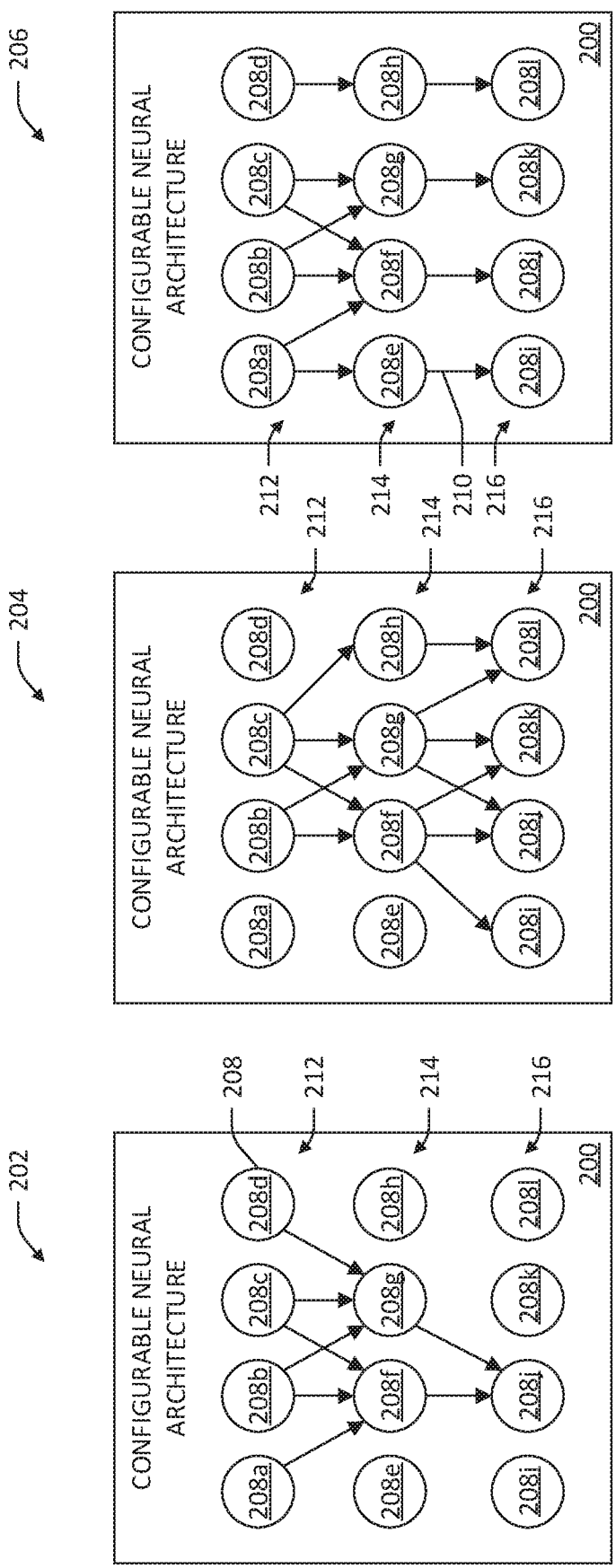

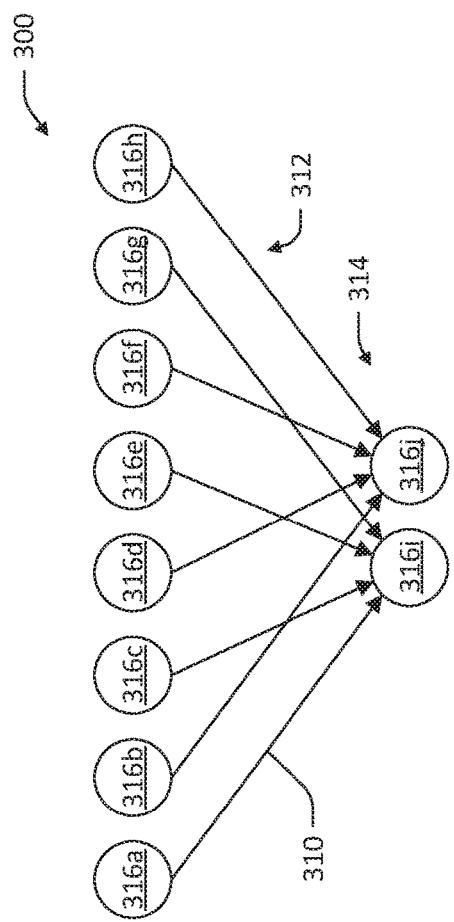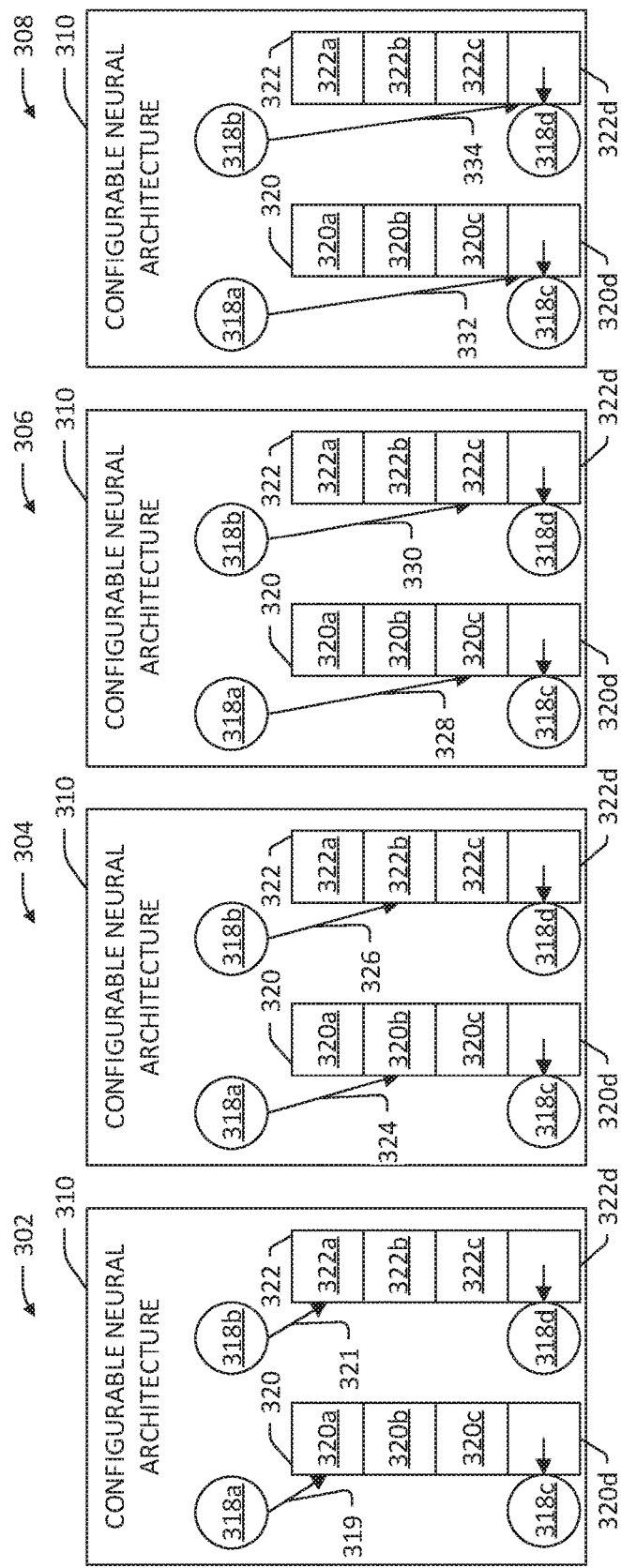

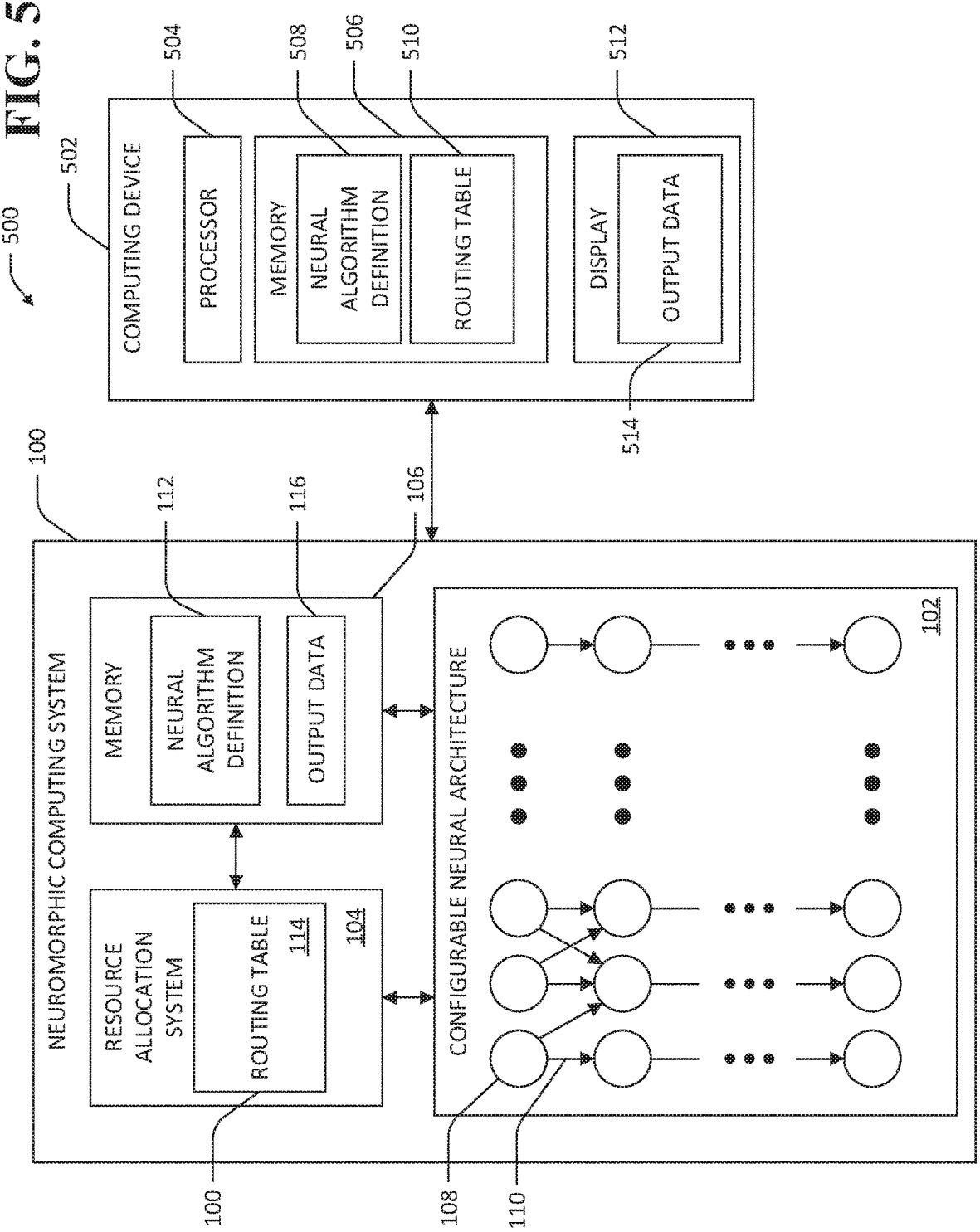

NEUROMORPHIC COMPUTING ARCHITECTURE WITH DYNAMICALLY ACCESSIBLE CONTEXTS

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Neural networks are computational models that are used in many artificial intelligence and machine-learning applications such as computer vision, speech recognition, classification systems, etc. Nearly any algorithm can be modeled using a neural network graph, executed as a neural algorithm. The neural network graph is representative of the neural algorithm and comprises nodes and edges that are analogous to neurons and synapses, respectively. Any given neural algorithm can be represented by a neural network graph of some minimum size, defined by a minimum number of nodes (neurons) and a corresponding minimum number of edges (synapses).

Neuromorphic computing systems are computing architectures that have been developed to efficiently execute neural algorithms. Current neuromorphic computing systems are typically configurable arrangements of at least two types of physical computing resources: neuron circuits and synapse connections that connect one neuron circuit to another. In an example, a neuron circuit comprises an arrangement of logic gates or simple arithmetic units capable of performing relatively simple processing operations (e.g., if input>x then output y, else output 0). By way of another example, a synapse connection can be a crosspoint memory location. Conventional neuromorphic computing systems generally execute nodes of multi-layer neural algorithms in parallel, such that all nodes (or neurons) in a single layer of a neural algorithm are processed simultaneously.

Practical neuromorphic computing systems have a finite number of neuron circuits and synapse connections. Conventional neuromorphic computing systems either 1) are limited to executing neural algorithms in which all layers can be represented with the same or smaller number of neurons as the system has neuron circuits or 2) for neural algorithms that require a greater number of neurons than the system has neuron circuits, must transfer all or part of the computation of the neural algorithm off-chip to another neuromorphic or other computing system for processing, and transfer results back. Transferring data between neuromorphic computing systems, however, can increase power and time required for a neuromorphic computing system to execute the algorithm. Thus, if an algorithm requires a greater number of neurons than there are neuron circuits available on a conventional neuromorphic computing system, power and time advantages of using the neuromorphic computing system to execute the algorithm may be lost.

SUMMARY

The following is a brief summary of subject matter that is described in greater detail herein. This summary is not intended to be limiting as to the scope of the claims.

Various technologies pertaining to allocating resources of a neuromorphic computing system to execute a neural algorithm are described herein. The neuromorphic computing system comprises a configurable neural architecture comprising a plurality of neuron circuits and a plurality of synapse connections, wherein each synapse connection connects a neuron circuit to another neuron circuit in the configurable neural architecture. The neuromorphic computing system further comprises a resource allocation system that controls configuration of the configurable neural architecture to cause the configurable neural architecture to execute the neural algorithm.

The neuromorphic computing system is further configured to provide output data from a first neuron circuit to a second neuron circuit by way of a synapse connection such that the output data is received by the second neuron circuit at a particular time or with a particular delay. By way of example, the neuron circuits in the configurable neural architecture can each include a respective delay buffer, wherein data received at a neuron circuit is received by way of its delay buffer with a time delay based upon configuration of the configurable neural architecture. For example, a synapse connection between the first neuron circuit and the second neuron circuit can be configured to provide output data output by the first neuron circuit to the delay buffer of the second neuron circuit. The synapse connection can provide the output data at a particular location of the delay buffer, wherein the particular location is associated with a particular delay time. In another example, the synapse connection can provide the output data and timing data that is paired to the output data to the delay buffer, wherein the delay buffer provides the output data to the second neuron circuit at a time based upon the timing data.

The resource allocation system can reconfigure the configurable neural architecture a plurality of times during execution of the neural algorithm. In one example, the neural algorithm comprises a plurality of layers (e.g., represented as a neural graph that comprises nodes in a plurality of layers, wherein nodes in a layer may be connected to at least one other node in an adjacent layer). In the example, the resource allocation system reconfigures the configurable neural architecture a plurality of times during evaluation of a single layer of the neural algorithm, wherein the single layer comprises a greater number of nodes (neurons) than the configurable neural architecture has available neuron circuits. Continuing the example, the resource allocation system identifies a plurality of subgraphs of the neural algorithm graph, wherein the subgraphs are representative of connections between nodes of the single layer and nodes of a next layer in the neural algorithm graph. The resource allocation system configures the configurable neural architecture to execute the subgraphs of the neural algorithm serially. Output data of first-layer neuron circuits in each subgraph are provided to second-layer neuron circuits such that the second-layer neuron circuits receive output data from all connected first-layer neuron circuits simultaneously. In another example, the neural algorithm comprises a plurality of layers, and the resource allocation system reconfigures the configurable neural architecture to cause a same group of neuron circuits to represent nodes in a different layer of the neural algorithm at each of a plurality of times. By way of example, the same group of neuron circuits can execute nodes in a first layer of the neural algorithm at a first time, and nodes in a second layer of the neural algorithm at a second time. The group of neuron circuits executes the nodes in the second layer based upon data output by the same group of neuron circuits in connection with executing the nodes in the first layer.

The neuromorphic computing system described herein can therefore execute neural algorithms that have larger numbers of neurons than a number of available neuron circuits in the neural architecture. The neuromorphic computing system described herein is suited to execution of deep learning networks, computational analysis, etc.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 2 is a diagram of a configurable neural computing architecture in a plurality of configurations.

FIG. 3A is a neural algorithm graph of an exemplary neural algorithm.

FIG. 3B is a diagram of an exemplary configurable neural architecture at a plurality of times during execution of the exemplary neural algorithm of FIG. 3A.

FIG. 5 is a functional block diagram of an exemplary computing environment that includes a neuromorphic computing system and a conventional computing device.

DETAILED DESCRIPTION

Figure 1:
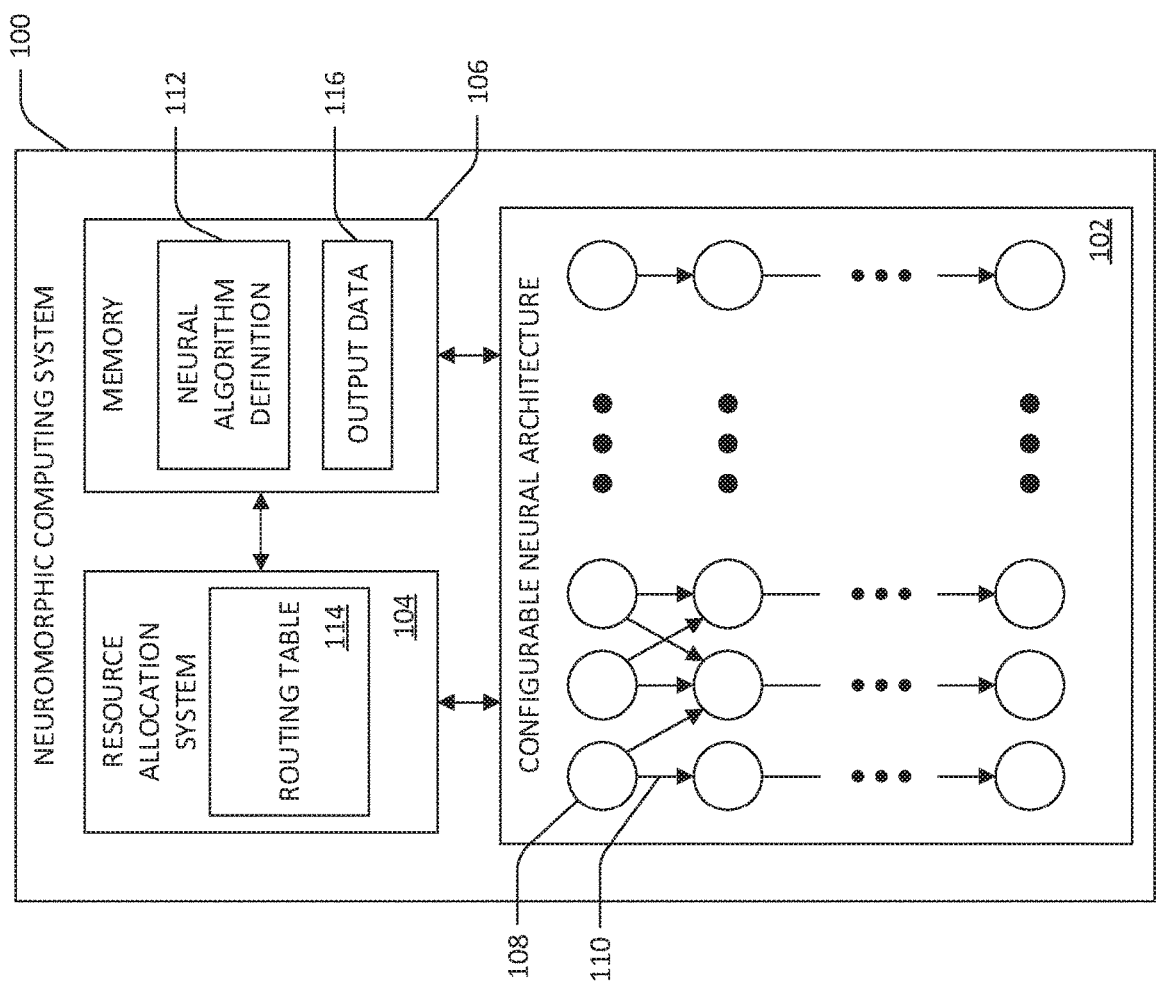
FIG. 1 is a functional block diagram of an exemplary neuromorphic computing system that facilitates execution of neural network algorithms.

Various technologies pertaining to allocating physical computing resources of a neuromorphic computing system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary neuromorphic computing system 100 that facilitates execution of neural algorithms by way of serially executing subgraphs of the neural algorithm is illustrated. In particular, the neuromorphic computing system 100 facilitates execution of neural algorithms that have layers of a greater size (i.e., layers represented in a neural algorithm graph by a greater number of nodes) than a number of neuron circuits available in a neural computing architecture. The system 100 includes a configurable neural computing architecture 102 that executes neural algorithms, a resource allocation system 104 that configures the configurable neural architecture 102 to execute neural algorithms, and memory 106 that can store program data, algorithm execution data, etc.

The configurable neural architecture 102 comprises a plurality of neuron circuits 108 and a plurality of synapse connections 110 that each connect one neuron circuit to another neuron circuit. The neuron circuits 108 each comprise a plurality of circuit elements (e.g., logic gates, simple arithmetic logic units) that in combination are configured to perform relatively simple processing operations in order to mimic or approximate behavior of biological neurons. For example, the neuron circuits 108 can be configured as spiking neuron circuits, wherein responsive to a programmed condition being met (e.g., input variable x greater than constant value a) a neuron circuit in the neuron circuits 108 outputs a voltage "spike." In other examples, the neuron circuits 108 output signals based upon other non-linear thresholding criteria.

The synapse connections 110 each link one of the neurons 108 to another component. By way of example, a synapse connection in the synapse connections 110 can link one of the neurons 108 to another neuron such that a first neuron circuit passes its output to a second neuron circuit by way of a synapse connection. In another example, a synapse connection in the synapse connections 110 can link a neuron to a component external to the configurable neural architecture (e.g., the memory 106, or another circuit, not shown, that is external to the neuromorphic computing system 102). In one embodiment, the synapse connections 110 are directional connections, such that data is transmitted from a first neuron circuit to a second neuron circuit by way of a synapse connection but data is not transmitted from the second neuron circuit to the first neuron circuit. In some embodiments, the synapse connections 110 are configured such that a synapse connection applies a weight to output data from a first neuron circuit before providing the output data to a second neuron circuit. For example, a synapse connection can apply a learned scaling factor to data that it transmits from one neuron circuit to another based upon a learning scheme executed independently of or as part of a neural algorithm executed by the neuromorphic computing system 100. In other embodiments, the synapse connections 110 provide data output by a first neuron to a second neuron without applying any weighting. Thus, in various embodiments the synapse connections 110 can be relatively simple unidirectional connections (e.g., a conductive path through a diode) between neuron circuits, or the synapse connections 110 can be or include combinations of active components configured to apply and update output weighting factors based upon output data passed between neuron circuits.

The configurable neural architecture 102 is constructed such that the synapse connections 110 can be reconfigured responsive to control input received from the resource allocation system 104 at the configurable neural architecture 102. For example, and referring now to FIG. 2, an exemplary configurable neural architecture 200 is illustrated in a plurality of different configurations 202-206 of neuron circuits 208 and synapse connections 210, in connection with executing various exemplary neural algorithms comprising distinct layers (e.g., deep learning algorithms). It is to be understood that neuron circuits in configurable neural architectures described herein are not limited to representing neural algorithms in distinct layers. In the first configuration 202, the neuron circuits 208 are connected by the synapse connections 210 in three layers 212-216, wherein each of the layers 212-216 corresponds to a different layer of a three-layer neural algorithm. Neuron circuits 208a-208d comprise the first layer 212, and are connected by way of synapse connections 210 to neuron circuits 208f and 208g, which comprise the second layer 214, as follows: neuron circuit 208a connected to neuron circuit 208f; neuron circuit 208b connected to neuron circuits 208f and 208g, neuron circuit 208c connected to neuron circuits 208f and 208g, and neuron circuit 208d connected to neuron circuit 208g. The second-layer neuron circuits 208f and 208g are each connected by way of a respective synapse connection to the neuron circuit 208j, which represents the third layer 216 of the neural algorithm represented by the configuration 202 of the neural architecture 200.

Responsive to receiving a control input signal from the resource allocation system 104, the configurable neural architecture 200 changes connections of the synapses 210 to the second configuration 204. In the second configuration 204, neuron circuits 208b and 208c represent the first layer 212 of a second neural algorithm, and are connected to neuron circuits 208f-208h, which represent the second layer 214 of the second neural algorithm, by way of synapse connections as follows: neuron circuit 208b connected to neuron circuits 208f and 208g; and neuron circuit 208c connected to neuron circuits 208f, 208g, and 208h. The second-layer neuron circuits 208f-208h are connected to neuron circuits 208i-208l, which represent the third layer 216 of the second neural algorithm, as follows: neuron circuit 208f connected to neuron circuits 208i-208k; neuron circuit 208g connected to neuron circuits 208j-208l; and neuron circuit 208h connected to neuron circuit 208l.

Responsive to receiving a second control input signal from the resource allocation system 104, the configurable neural architecture 200 reconfigures the synapse connections 210 to a third configuration. In the third configuration 206, the configurable neural architecture 200 is configured to execute third and fourth neural algorithms simultaneously in parallel. In the third configuration 206, the neuron circuits 208a-208c represent the first layer 212 of a third neural algorithm, while the neuron circuit 208d represents the first layer 212 of a fourth neural algorithm. The neuron circuits 208a-208c are connected as follows to neuron circuits 208e-208g, which represent the second layer of the third neural algorithm: neuron circuit 208a connected to neuron circuits 208e and 208f; neuron circuit 208b connected to neuron circuits 208f and 208g; and neuron circuit 208c connected to neuron circuits 208f and 208g. The neuron circuit 208d is connected to neuron circuit 208h, which represents the second layer 214 of the fourth neural algorithm. Finally, the neuron circuits 208e-208g are connected to the third-layer neuron circuits 208i-208k, respectively, while the neuron circuit 208h is connected to the neuron circuit 208l.

It is to be understood that while neuron circuits 208a-208d are depicted in a first row, neuron circuits 208e-208h are depicted as being arranged in a second row, and neuron circuits 208i-208l are depicted as being arranged in a third row, technologies described herein as applicable to neuron circuits in a configurable neural architecture are not limited by a specific physical arrangement of the neuron circuits with respect to one another. By way of example, neuron circuit 208f in the configurable neural architecture 200 can be configured to represent a neuron in a first layer, a second layer, a third layer, etc. of a neural algorithm. Furthermore, as will be apparent to one of skill in the art, not all neuron circuits or synapse connections in a configurable neural architecture need be used to represent a neural algorithm. In some embodiments, a first subset of neuron circuits in a configurable neural architecture can be configured to execute a first neural algorithm while a second subset of neuron circuits in a configurable neural architecture can be configured to execute a second neural algorithm in parallel with the first neural algorithm.

It is further to be understood that, while the exemplary configurable neural architecture 200 is shown as including twelve neuron circuits 208a-208l, the configurable neural architecture 102 and aspects described herein with respect to the configurable neural architecture 102 can have or are applicable to substantially any number of neuron circuits. Further, technologies described herein are suited to allocation of computing resources of a neuromorphic computing system in connection with executing substantially any number of layers of a neural algorithm, or substantially any number of nodes of a layer of the neural algorithm. Thus, it is to be understood that technologies described herein for allocation of resources of a neuromorphic computing system are applicable to neuromorphic computing systems of various sizes (e.g., numbers of neurons and available synapse connections) and configurations.

In the exemplary configurations 202-206 of the configurable neural architecture 200, three-layer neural algorithms are shown as being implemented in the configurable neural architecture 200 wherein an entirety of each algorithm is implemented in the architecture 200 simultaneously. It is to be understood that in various embodiments the entirety of a neural algorithm is not implemented in the configurable neural architecture at the same time. For example, and as discussed in greater detail below, all or substantially all of the neuron circuits in a configurable neural architecture can be configured to process data for a first layer in a neural network graph representation of a neural algorithm having multiple layers. In other exemplary embodiments, the neuron circuits of a configurable neural architecture are configured to correspond to all neurons of an output or hidden layer of a neural network graph, and any remaining neuron circuits are configured to correspond to input nodes of the graph, such that all output nodes in the graph are represented by a respective neuron circuit.

Referring again to FIG. 1, the resource allocation system 104 comprises hardware and software elements configured to allocate resources of the configurable neural architecture 102 in order to cause the neuromorphic computing system 100 to execute a neural algorithm. For example, the resource allocation system 104 can comprise a conventional microprocessor or other hardware logic component (e.g., a field-programmable gate array, or FPGA, an application-specific integrated circuit, or ASIC, etc.) and additional supporting circuitry. The resource allocation system 104 is configured to access a neural algorithm definition 112 in the memory 106 of the neuromorphic computing system 100, wherein the neural algorithm definition 112 comprises data indicative of characteristics of a neural algorithm graph that is representative of a neural algorithm. For example, the neural algorithm definition 112 comprises data indicative of characteristics of nodes (which correspond to neurons of the neural algorithm) and edges (which correspond to synapse connections between the neurons of the neural algorithm) of the neural algorithm graph. Responsive to accessing the neural algorithm definition 112, the resource allocation system 104 provides control input signals to the configurable neural architecture 102 that cause the configurable neural architecture 102 to reconfigure the neuron circuits 108 and the synapse connections 110 to implement, in the configurable neural architecture 102, the neural algorithm described by the neural algorithm definition 112.

When synapse connections in a configurable neural architecture are reconfigured responsive to receipt of a control input signal, neuron circuits that are connected by way of synapse connections prior to the reconfiguration can either change or maintain their state value when the reconfiguration occurs. Similarly, neuron circuits that are connected by way of synapse connections after the reconfiguration can either change or maintain their state value when the reconfiguration occurs. In particular, the state values of neuron circuits may be associated with learned weights that are learned in connection with executing a particular neural algorithm. When the configurable neural architecture is reconfigured, it may or may not be desirable for these learned weights to affect execution of the reconfigured algorithm. In some embodiments, state values of the neuron circuits are reset to a default, or baseline, value responsive to receipt of the control input to reconfigure the configurable neural architecture.

The resource allocation system 104 identifies subgraphs of the neural algorithm graph, the neural algorithm graph defined by the neural algorithm definition 112, wherein the subgraphs of the neural network graph are executable independently of one another. In an example, the subgraphs of the neural network graph each comprise multiple nodes in a same layer of the neural network graph. In another example, a subgraph of the neural network graph can comprise nodes in different layers of the neural network graph. The resource allocation system 104 assigns execution of the subgraphs to a first group of neuron circuits in the neuron circuits 108, whereupon the first group of neuron circuits in the neuron circuits 108 executes the subgraphs serially.

To assign the execution of the subgraphs to the first group of neuron circuits, the resource allocation system 104 reconfigures the configurable neural architecture 102 to have a different configuration for each subgraph. The resource allocation system 104 generates a routing table 114 based upon the neural algorithm definition 112, wherein the routing table 114 comprises a listing of configuration operations to be performed by the resource allocation system 104 with respect to the configurable neural architecture 102. The configuration operations defined in the routing table 114, when executed by the resource allocation system 104, cause the configurable neural architecture 102 to execute the identified subgraphs of the neural network graph serially. For example, the configuration operations defined in the routing table 114, when executed by the resource allocation system 104, change the connectivity of the synapse connections 110 of the configurable neural architecture 102 to change connections among the neuron circuits. In another example, the configuration operations defined in the routing table 114 change processing functions executed by one or more of the neuron circuits 108 or other parameters of the neuron circuits 108. For example, the configuration operations defined in the routing table 114 can change a leakage parameter of a neuron circuit in the neuron circuits 108.

In some embodiments, the configurable neural architecture 102 can be configured to cause the first group of neuron circuits to execute subgraphs that comprise nodes within a single layer of a neural algorithm graph. For example, the configurable neural architecture 102 can be configured to cause the first group of neuron circuits to execute a first portion of a first layer of a neural algorithm graph at a first time. Subsequently, the configurable neural architecture 102 can be reconfigured to cause the first group of neuron circuits to execute a second portion of the first layer of the neural algorithm graph at a second time.

In other embodiments, the configurable neural architecture 102 can be configured to cause the first group of neuron circuits to execute subgraphs that comprise nodes in multiple layers of the neural algorithm graph. By way of example, the configurable neural architecture 102 can be configured to cause the first group of neuron circuits to execute nodes of a first layer of a neural algorithm graph at a first time, or over a first period of time. The configurable neural architecture 102 can then be reconfigured to cause the first group of neuron circuits to execute nodes of a second layer of the neural algorithm graph at a second time, or over a second period of time. The configurable neural architecture 102 can be reconfigured such that the first group of neuron circuits receives, at the second time or over the second period of time, data output by the first group of neuron circuits at the first time or over the first period of time.

From the foregoing, it is to be understood that the configurable neural architecture 102 can be configured to cause a same group of neuron circuits to execute subgraphs within a layer of a neural algorithm graph, or to cause a same group of neuron circuits to execute subgraphs across multiple layers of a neural algorithm graph.

The resource allocation system 104 executes the operations in the routing table 114 such that the configurable neural architecture 102 executes the subgraphs serially. The subgraphs identified by the resource allocation system 104 can be processed serially without changing the result of the computation of any of the individual subgraphs. In many neural algorithms, however, other parts of the algorithm may depend upon results of execution of the subgraphs. For example, the outputs of the subgraphs may be provided as inputs to other neurons in the algorithm. By way of example, in executing a multi-layer neural algorithm, processing of each node in a first layer may be independent of the processing of other nodes in the first layer, while each node in a second layer takes outputs of multiple nodes in the first layer as its input. In the example, processing of some or all of the nodes in the second layer is dependent upon the second-layer nodes receiving the outputs of the first-layer nodes simultaneously.

In one exemplary embodiment, the configurable neural architecture 102 can be configured so that first data output by neuron circuits at a first time and second data output by neuron circuits at a second time is received by neuron circuits at a same third time. For example, the neuron circuits 108 each comprise a respective delay buffer. In the exemplary embodiment, the delay buffer comprises time delay bins, and data output to a neuron circuit can be output to any of a plurality of time delay bins of the buffer. The time delay bins can be used to delay output of received data to a buffer's corresponding neuron circuit such that the neuron circuit receives, at a same time, a plurality of data signals received at the buffer at different times. In another exemplary embodiment, the neuron circuits 108 can be configured such that data output to a data buffer by a neuron circuit comprises timing data. In such exemplary embodiment, the neuron circuits 108 perform processing operations over the output data based upon the timing data, as described in greater detail below with respect to FIGS. 4A-4B. In another example, the delay buffers can be output delay buffers, such that a neuron circuit outputs data to its own time-delay buffer, so that data output by the neuron circuit at a plurality of times is transmitted from the time-delay buffer at a same time. In still another example, the synapse connections 110 can be configured to have a specified propagation delay time. The resource allocation system 104 can configure the synapse connections 110 of the configurable neural architecture 102 to have the specified propagation delay time such that data output by a first neuron at a first time reaches a second neuron at a desired time simultaneously with data output by a third neuron at a third time.

By way of example, and referring now to FIGS. 3A and 3B, an exemplary two-layer neural algorithm 300 and a plurality of configurations 302-308 of a configurable neural architecture 310 are shown. The configurations 302-308 cause the configurable neural architecture 310 to serially execute subgraphs of the neural algorithm 300, wherein a same group of neuron circuits represents different groups of nodes within a single layer of the neural algorithm 300 at a plurality of different times. Referring now to FIG. 3A, the exemplary two-layer neural algorithm 300 comprises a first layer 312 and a second layer 314 that each comprise a plurality of neuron nodes 316. The first layer 312 comprises eight neuron nodes 316a-316h, while the second layer 314 comprises two neuron nodes 316i-316j. The configurable neural architecture 310 comprises four available neuron circuits, 318a-318d. Thus, the first layer 312 of the neural algorithm 300 comprises a greater number of neuron nodes 316 than available neuron circuits 318 in the configurable neural architecture 310.

The resource allocation system 104 can configure the configurable neural architecture 310 to execute the entire two-layer neural algorithm 300 by separately executing independent subgraphs of the algorithm and providing output results of the independent subgraphs to dependent output nodes at a same time. The resource allocation system 104 identifies subgraphs of the two-layer neural algorithm 300 that are executable independently of one another, such that they may be executed serially. The resource allocation system 104 can identify the subgraphs based upon a number of available neuron circuits in the configurable neural architecture 310. The resource allocation system 104 can then provide control input to the configurable neural architecture 310 to allocate computing resources of the configurable neural architecture 310 to execute the subgraphs. For the two-layer algorithm 300, the resource allocation system 104 can configure the neuron circuits 318c and 318d to represent the output neurons 316i and 316j, respectively. The resource allocation system 104 can then segment the first layer 312 of the algorithm 300 into four independent subgraphs, wherein the neuron circuits 318a and 318b represent two of the nodes 316a-316h at a time.

The resource allocation system 104, upon identifying the independent subgraphs of the algorithm 300, configures the configurable neural architecture 310 to execute the subgraphs serially. The resource allocation system 104 configures the configurable neural architecture 310 into a first configuration 302, a second configuration 304, a third configuration 306, and a fourth configuration 308, at first, second, third, and fourth respective times. The first configuration 302 is configured to cause the architecture 310 to execute a first subgraph in the subgraphs, the second configuration 304 is configured to cause the architecture 310 to execute a second subgraph in the subgraphs, the third configuration 306 is configured to cause the architecture 310 to execute a third subgraph in the subgraphs, and the fourth configuration 308 is configured to cause the architecture 310 to execute a fourth subgraph in the subgraphs. Thus, by configuring the configurable neural architecture 310 with the configurations 302-308 at four different times, the resource allocation system 104 allocates computing resources of the configurable neural architecture to execute the subgraphs serially.

Figure 3C:
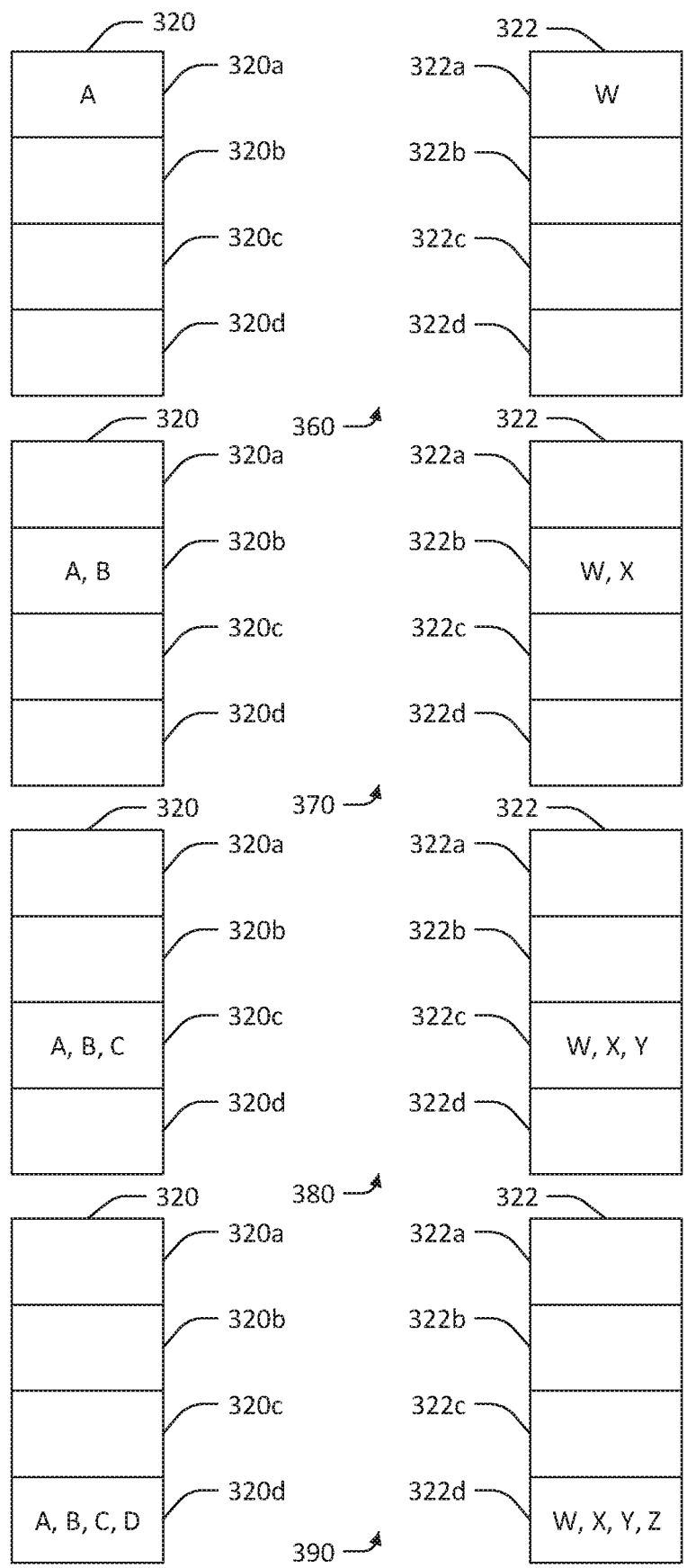
FIG. 3C is a diagram of time delay buffers in the exemplary configurable neural architecture of FIG. 3B, illustrating contents of the time delay buffers at the plurality of times.

Responsive to receiving first control input from the resource allocation system 104 at the first time, the configurable neural architecture 310 is reconfigured as follows. Neuron circuit 318a is connected by a synapse connection 319 to a first time-delay buffer 320 that corresponds to and outputs data to neuron circuit 318c. The neuron circuit 318b is connected by a synapse connection 321 to a second time-delay buffer 322 that corresponds to and outputs data to neuron circuit 318d. In the first configuration 302, the neuron circuit 318a processes node 316a and the neuron circuit 318b processes node 316b. While the nodes 316a-316h have outputs that are independent of one another, the second-layer nodes 316i, 316j are dependent upon the outputs of a plurality of the first-layer nodes 316a-316h. For each of the second-layer nodes 316i, 316j, all the node's inputs must be received simultaneously. Thus, in the first configuration 302 the neuron circuits 318a and 318b output results data to first locations 320a and 322a in respective buffers 320, 322, wherein the locations 320a and 322a correspond to a first time delay. For example, the locations 320a, 322a can correspond to a time delay of three processing cycles, in order to give time for the configurable neural architecture 310 to execute three remaining subgraphs. Referring now to FIG. 3C, contents of the buffers 320 and 322 are shown for the four different times 360, 370, 380, 390 corresponding to the configurations 302-308 of the configurable neural architecture 310, respectively. For the time 360 corresponding to the first configuration 302, results data A (as output by neuron circuit 318a) is in the first location 320a of buffer 320 while results data W (as output by neuron circuit 318b) is in the first location 322a of buffer 322.

Responsive to receiving second control input from the resource allocation system 104 at the second time, the configurable neural architecture 310 is reconfigured according to the second configuration 304. Neuron circuit 318a is connected by a synapse connection 324 to a second location 320b in the buffer 320, and neuron circuit 318b is connected by a synapse connection 326 to a second location 322b in the buffer 322, wherein the second locations 320b, 322b correspond to a second time delay. In the second configuration 304 the neuron circuits 318a, 318b process nodes 316c and 316d of the algorithm 300, respectively. The second time delay is less than the first time delay, and is configured to cause second results data output by the neuron circuits 318a and 318b at the second time to reach the output neuron circuits 318c and 318d at the same time as the first results data A and W. Referring again to FIG. 3C, at the second time 370 the data A and the data W shift to the second locations 320b, 322b of the buffers 320 and 322, respectively. The neuron circuit 318a outputs data B that results from processing node 316c into the second location 320b of the buffer 320. The neuron circuit 318b outputs data X that results from processing node 316d into the second location 322b of the buffer 322. Thus, at the second time 370 the buffer 320 contains output data A and B in its second location 320b, while the buffer 322 contains output data W and X in its second location 322b.

Responsive to receiving third control input from the resource allocation system 104 at the third time, the configurable neural architecture 310 is reconfigured according to the third configuration 306. Neuron circuit 318a is connected by a synapse connection 328 to a third location 320c in the buffer 320 that corresponds to a third time delay. Neuron circuit 318b is connected by a synapse connection 330 to a third location 322c in the buffer 322 that corresponds to the third time delay. The neuron circuit 318a processes node 316e and outputs data C to the third location 320c, while the neuron circuit 318b processes node 316f and outputs data Y to the third location 322c. Referring once again to FIG. 3C, at the third time 380 data A and B shift from location 320b to location 320c in the buffer 320, while the neuron circuit 318a outputs the data C to the third location 320c. Thus, at the third time 380 the buffer 320 contains data A, B, and C in the third location 320c. Similarly, the data W and X shift from location 322b to location 322c in the buffer 322, while the neuron circuit 318b outputs the data Y to the third location 322c. Therefore, at the third time 380 the buffer 322 contains data W, X, and Y in the third location 322c.

Responsive to receiving fourth control input from the resource allocation system 104 at the fourth time, the configurable neural architecture 310 is reconfigured according to the fourth configuration 308. Neuron circuit 318a is connected by a synapse connection 332 to a fourth location 320d in the buffer 320 that corresponds to a fourth time delay. Neuron circuit 318b is connected by a synapse connection 334 to a fourth location 322d in the buffer 322 that corresponds to the fourth time delay. In an exemplary embodiment, the fourth time delay is zero, such that data provided to the fourth locations 320d, 322d in the buffers 320 and 322 are passed to the neuron circuits 318c and 318d, respectively, without a delay. For example, referring yet again to FIG. 3C, at the fourth time 390 the data A, B, and C shift from the location 320c to the location 320d, while data D resulting from processing of node 316g in the algorithm 300 is output to the location 320d by the neuron circuit 318a. Data A, B, C, and D are provided to the buffer 320d simultaneously, and so are provided to the output neuron circuit 318c simultaneously. Likewise, the data W, X, and Y shift from the location 322c to the location 322d, while data Z, which results from processing of node 316h in the algorithm 300, is output to the location 322d by the neuron circuit 318b. Data W, X, Y, and Z are provided to the buffer 322d simultaneously, and are therefore provided to the output neuron circuit 318d simultaneously. Responsive to receiving the data A, B, C, and D, the output neuron circuit 318c performs a processing operation based upon A, B, C, and D as inputs, and outputs data based upon such processing. Responsive to receiving the data W, X, Y, and Z, the output neuron circuit 318d performs a processing operation based upon W, X, Y, and Z as inputs, and outputs data based upon the processing. Data output by the neuron circuits 318c, 318d can be provided to other neuron circuits in the configurable neural architecture 310 by way of synapse connections, or can be provided as algorithm output data to a memory device or other external system.

It is to be understood that for a particular neural algorithm there may be a plurality of different independent subgraph configurations that can be executed serially on a configurable neural architecture as described herein. For example, since the second-layer node 316i in the algorithm 300 depends only upon the outputs of nodes 316a, 316c, 316e, and 316g, the resource allocation system 104 can configure the configurable neural architecture 310 to execute nodes 316a, 316c, 316e, and 316g prior to executing any of the remaining nodes in the first layer 312 of the algorithm 300. The resource allocation system 104 can be configured to allocate execution of nodes of a neural algorithm based upon algorithm-specific parameters such as efficiency of execution of the particular neural algorithm or dependencies of subgraphs of the neural algorithm graph.

Still further it is to be understood that a neuron circuit can output data to itself by way of the configurable neural architecture. By way of example, the neuron circuits 318c and 318d can be configured to execute the subgraphs of the neural algorithm 300 rather than the neuron circuits 318a and 318b. The neuron circuits 318c and 318d can output results of execution of the subgraphs to their own respective time-delay buffers 320 and 322 as described above. Thus, a neuron circuit in a configurable neural architecture can be configured to receive input from itself, or put another way to output data to itself, so that a single neuron circuit can process subgraphs independently of other neuron circuits.

Figure 4A:
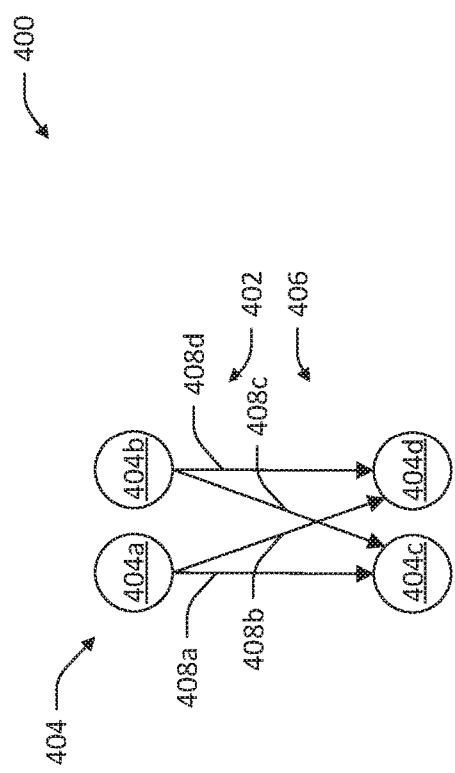
FIG. 4A is a neural algorithm graph of another exemplary neural algorithm.
Figure 4B:
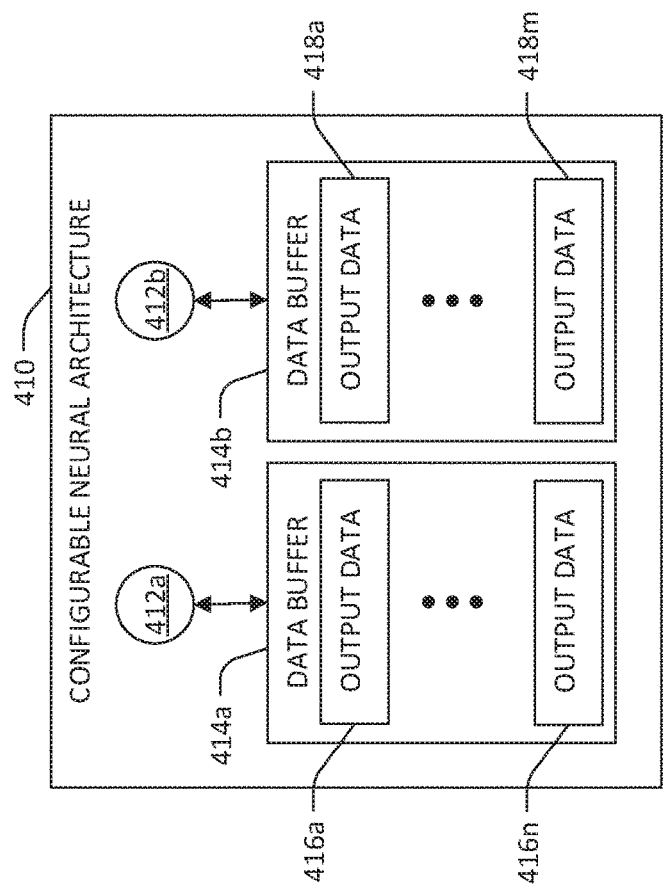
FIG. 4B is a diagram of an exemplary configurable neural architecture in connection with executing the neural algorithm of FIG. 4A.

Referring now to FIGS. 4A-4B, another exemplary embodiment of a configurable neural architecture is shown, wherein neuron circuits of the configurable neural architecture process data that is received by way of data buffers based upon timing data associated with such received data. In the exemplary embodiment shown in FIGS. 4A-4B, a same group of neuron circuits represents nodes in a first layer of a neural algorithm over a first period of time, and represents nodes in a second layer of a neural algorithm over a second period of time. Referring now solely to FIG. 4A, a neural algorithm graph of an exemplary neural algorithm 400 is shown. The neural algorithm 400 comprises a first layer 402 of neurons 404 represented by nodes 404a, 404b and a second layer 406 of neurons 404 represented by nodes 404c, 404d. Node 404a is connected to nodes 404c and 404d by way of respective synapse connections 408a and 408b. Node 404b is connected to nodes 404c and 404d by way of synapse connections 408c and 408d, respectively.

Referring now to FIG. 4B, an exemplary configurable neural architecture 410 is illustrated, wherein the configurable neural architecture 410 can be configured to execute the neural algorithm 400 for a plurality of time steps. The configurable neural architecture 410 comprises neuron circuits 412a and 412b, wherein the neuron circuits 412a and 412b are coupled to corresponding respective data buffers 414a and 414b.

The configurable neural architecture 410 can be configured to execute the neural algorithm 400 for a plurality of times. In an example, the configurable neural architecture 410 can be configured to execute the neural algorithm as modeled in a time period from time $t_1$-$t_5$ as follows, where $t_1$-$t_5$ are times for which states of the neurons 404a-404d of the neural algorithm 400 are to be evaluated. As will be apparent from the following description, the configurable neural architecture 410 may be configured to execute the neural algorithm 400 for the times $t_1$-$t_5$ over a period that is longer in duration than the duration of $t_1$-$t_5$.

The configurable neural architecture 410 is first configured to represent the neuron nodes 404a and 404b by the neuron circuits 412a and 412b, respectively. By way of example, the neuron circuits 412a and 412b are each configured to perform processing operations corresponding to operations of the respective nodes 404a and 404b. The neuron circuits 412a and 412b receive input data for the times $t_1$-$t_5$, and perform the processing operations relative to the input data. In some embodiments, the neuron circuits 412a and 412b receive input data directly from other neuron circuits at various times in the period $t_1$-$t_5$. In other embodiments, the neuron circuits 412a and 412b receive input data from time delay buffers, as described above with respect to FIGS. 3A-3B. In still other embodiments, the neuron circuits 412a and 412b receive input data by reading their corresponding data buffers 414a and 414b, as described in great detail below.

As the neuron circuits 412a and 412b perform processing operations over the period $t_1$-$t_5$, the neuron circuits 412a and 412b can output data for a plurality of different times in the period $t_1$-$t_5$. By way of example, the neurons 404a and 404b in the neural algorithm 400 can be spiking neurons, and the neuron circuits 412a and 412b can be configured as spiking neuron circuits such that the neuron circuits 412a and 412b output a "spike" (e.g., a voltage signal of specified duration) at a time for which the integrated input of the neuron circuit exceeds a threshold. For example, suppose the neuron circuit 412a is configured to spike responsive to receipt of input that causes the integrated value of received inputs to meet or exceed two spikes. If the neuron circuit 412a receives a first spike at $t_1$ and a second spike at $t_3$, then the neuron circuit 412a will output a spike at $t_3$. The neuron circuits 412a and 412b can output data to their respective data buffers 414a and 414b, wherein the output data comprises an output value and associated timing data. The timing data is indicative of a time at which the neuron circuit output the data. Thus, after a period of execution during which operations of the neuron circuits 412a and 412b represent the neuron nodes 404a and 404b for the time period $t_1$-$t_5$, the data buffers 414a and 414b comprise output data and associated timing data. For example, the data buffer 414a comprises output data 416a-416n, and the data buffer 414b comprises output data 418a-418m, where n is a number of times data is output by the neuron circuit 412a and m is a number of times data is output by the neuron circuit 412b.

Responsive to receipt of a control signal, the configurable neural architecture 410 is reconfigured such that the neuron circuits 412a and 412b represent the nodes 404c and 404d, respectively. The neuron circuits 412a and 412b perform processing operations representative of the neuron nodes 404c and 404d over the time period $t_1$-$t_5$. The neuron circuits 412a and 412b read the output data from their respective data buffers 414a and 414b, and perform processing operations based on the output data and associated timing data. In the second configuration of the configurable neural architecture 410, the neuron circuits 412a and 412b output data to the data buffers 414a and 414b based in part upon the timing data associated with the output data 416a-416n and 418a-418m. For example, suppose in the second configuration of the neuron circuit 412a that the neuron circuit 412a is configured to spike responsive to an integrated input value at the neuron circuit 412a meeting or exceeding three spikes. If the output data 416a-416n comprises a spike at $t_2$, a spike at $t_3$, and a spike at $t_4$, the neuron circuit 412a outputs data that comprises timing data indicating that the neuron circuit 412 output a spike at $t_4$. The neuron circuits 412a and 412b therefore output data indicative of outputs of the nodes 404c and 404d for the times $t_1$-$t_5$, though the processing operations of the neuron circuits 412a and 412b in connection with generating the output data may occur in a different time period.

It is to be understood that the buffering approach described with respect to FIGS. 4A and 4B is applicable to execution of independent subgraphs within layers of a neural algorithm. For example, and referring again to FIGS. 3A-3C the neuron circuits 318a and 318b could include timing data with the data {A, B, C, D} and {W, X, Y, Z} output for each of the subgraphs of layer 312. The output neuron circuits 318c and 318d can then perform processing operations representative of neuron nodes 316i and 316j based in part upon the timing data, such that nodes 316i and 316j output data as if the neuron circuits 318c and 318d had received the data {A, B, C, D} and {W, X, Y, Z} simultaneously, as described with respect to FIG. 3.

Referring again to FIG. 1, data output by the neuron circuits 108 in the configurable neural architecture 102 can be output to other neuron circuits in the configurable neural architecture 102. Data output by the neuron circuits 108 in the configurable neural architecture 102 can also be output to the memory 106 of the neuromorphic computing system 106 as output data 116. For example, data output by neuron circuits that represent output nodes in a multi-layer neural algorithm can be output from the configurable neural architecture 102 to the memory 106.

The neuromorphic computing system 100 can further be included in a computing environment wherein the neuromorphic computing system 100 communicates with other, conventional computing devices. For example, referring now to FIG. 5, a computing environment 500 is illustrated, wherein the computing environment 500 includes the neuromorphic computing system 100 and a computing device 502 in communication with the neuromorphic computing system 100. The computing device 502 comprises a processor 504 and memory 506 that comprises instructions that are executed by the processor. In exemplary embodiments, the computing device 502 communicates with the neuromorphic computing system 100 to provide program instructions or receive output data. By way of example, the memory 506 of the computing device 502 can include a neural algorithm definition 508 of a neural algorithm, and the neural algorithm definition 508 can be transmitted to the neuromorphic computing system 100 by the computing device 502 for use as the neural algorithm definition 112. By way of another example, the memory 506 of the computing device 502 includes a routing table 510 of configuration operations, and the routing table 510 can be transmitted to the neuromorphic computing system 100 for use as the routing table 114. In other exemplary embodiments, the neuromorphic computing system 100 transmits the output data 116 to the computing device 502, whereupon the computing device 502 can use the output data 116 as input to other computing operations. In still other exemplary embodiments the computing device 502 comprises a display 512, and responsive to receiving the output data 116 from the neuromorphic computing device 100, the computing device 502 presents the output data 514 on the display 512.

Figure 6:
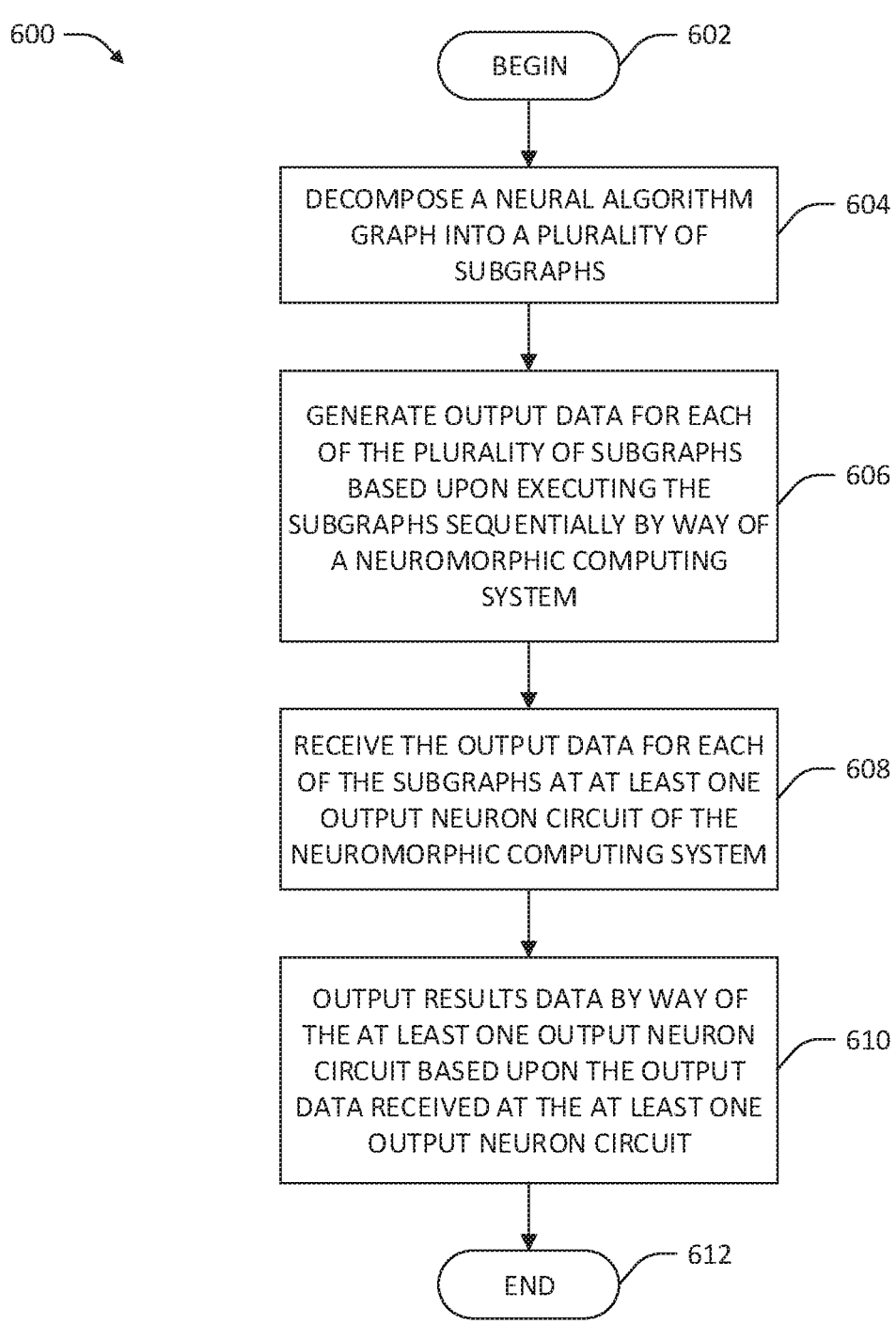
FIG. 6 is a flow diagram that illustrates an exemplary methodology for allocating physical computing resources of a neuromorphic computing system.

FIG. 6 illustrates an exemplary methodology relating to allocating resources of a neuromorphic computing system that comprises neuron circuits and synapse connections in connection with executing a neural algorithm. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, some acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like. In other embodiments, acts described herein may be programs executed by various hardware logic components (e.g., FPGAs, ASICs, etc.)

Referring now to FIG. 6, a methodology 600 for allocating resources of a neuromorphic computing device that facilitates execution of neural algorithms on the neuromorphic computing device is illustrated. The methodology 600 begins at 602, and at 604 a neural algorithm graph that is representative of a neural algorithm to be executed on the neuromorphic computing device is decomposed into a plurality of subgraphs. The subgraphs are independent subgraphs in that they are executable sequentially, rather than in parallel, without changing a result of their computation. Thus, for example, nodes in a single layer of a directed acyclic graph are independent subgraphs of the directed acyclic graph. At 606, output data is generated for each of the plurality of subgraphs based upon sequentially executing the subgraphs by way of a neuromorphic computing system. For example, a first group of neuron circuits in the neuromorphic computing system can be assigned execution of the subgraphs, and the first group of neuron circuits can execute the subgraphs serially, wherein each of the neuron circuits in the first group of neuron circuits executes its element of each subgraph in parallel with the other neuron circuits in the first group. The output data for each of the subgraphs is received at at least one output circuit of the neuromorphic computing system at 608. Continuing the example, the first group of neuron circuits can output the output data generated at 606 to a second group of neuron circuits that act as a group of output neuron circuits. In an exemplary embodiment, the first group of neuron circuits can output the output data for each of the subgraphs to time-delay buffers of the second group of neuron circuits, causing the output data generated by the first group of neuron circuits for each of the subgraphs to be delayed such that the output data is received at the second group of neuron circuits all at a same time. At 610 results data is output by way of the at least one output neuron circuit based upon the output data received at the at least one output neuron circuit at 608. By way of example, the at least one output neuron circuit receives the output data for each of the subgraphs generated at 606 and uses the generated output data as inputs to its own processing operations. The at least one output neuron circuit then outputs results of its own processing as results data at 610, where the results data are results of execution of the neural algorithm. The methodology 600 ends at 612.

Figure 7:
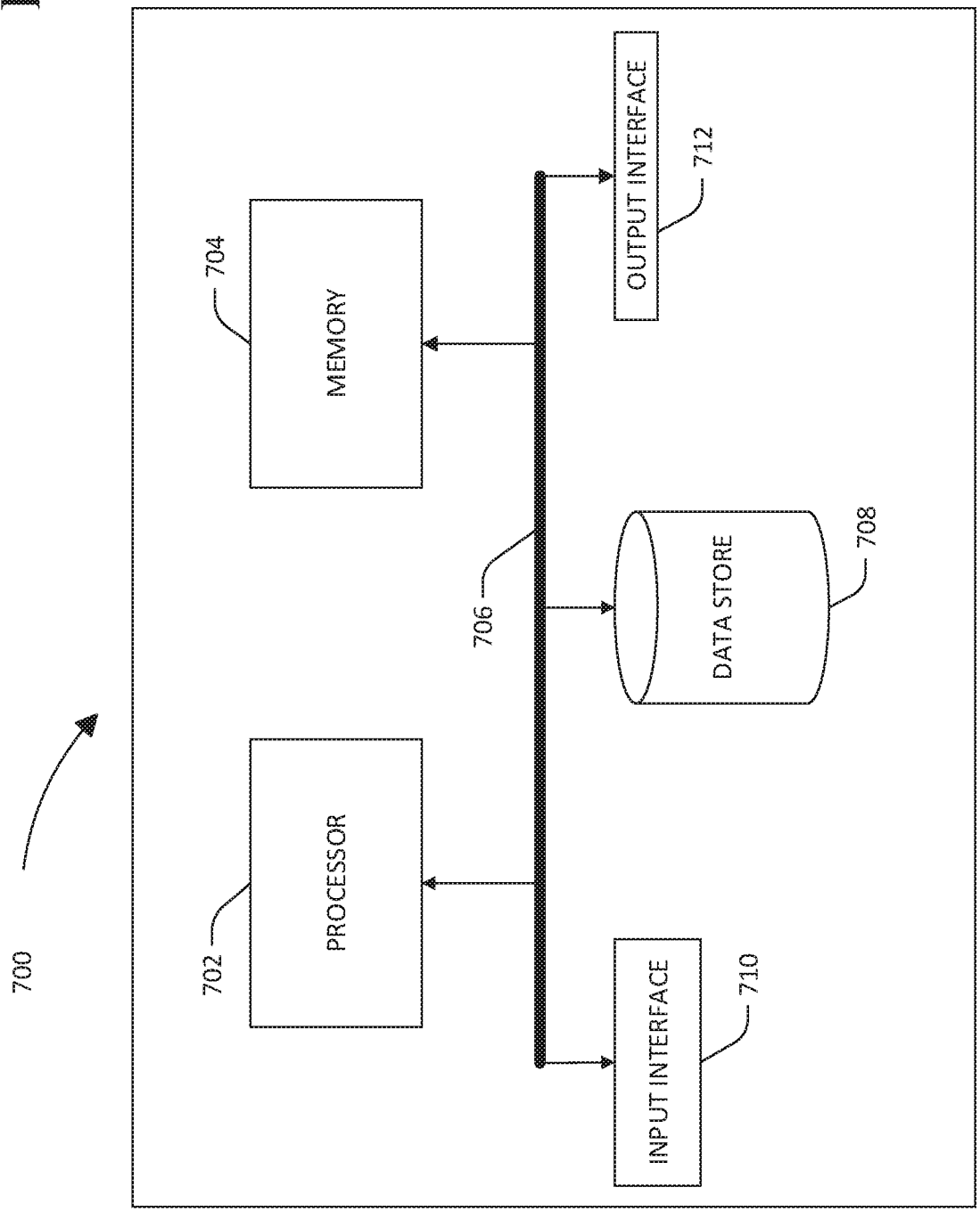
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be used in a computing system that facilitates programming of a neuromorphic computing system (e.g., as in the computing environment 500 illustrated in FIG. 5). By way of another example, the computing device 700 can be used in a system that facilitates presentment of data generated by way of a neuromorphic computing system. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store a neural algorithm definition for programming a neuromorphic computing system, output data of a neural algorithm received from a neuromorphic computing system that executes the neural algorithm, etc.

The computing device 700 additionally includes a data store 708 that is accessible by the processor 702 by way of the system bus 706. The data store 708 may include executable instructions, neural algorithm definitions, neural algorithm output data, etc. The computing device 700 also includes an input interface 710 that allows external devices to communicate with the computing device 700. For instance, the input interface 710 may be used to receive instructions from an external computer device, from a user, etc. In other examples, the input interface 710 may be used to receive output data from a neuromorphic computing system. The computing device 700 also includes an output interface 712 that interfaces the computing device 700 with one or more external devices. For example, the computing device 700 may display text, images, etc. by way of the output interface 712. In another example, the computing device 700 may communicate with a neuromorphic computing system by way of the output interface 712 in connection with providing the neuromorphic computing system with a neural algorithm definition or a routing table that causes the neuromorphic computing system to execute a particular neural algorithm.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, various aspects of the functionally described herein can be performed, at least in part, by one or more hardware logic components. For example, and without limitation, illustrative types of hardware logic components that can be used include FPGAs, ASICs Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A neuromorphic computing system comprising:
   a plurality of neuron circuits;
   a plurality of synapse connections, the synapse connections connecting each of the neuron circuits to at least one other neuron circuit in the neuron circuits; and
   a resource allocation system that allocates resources of the neuromorphic computing system to execute a neural network algorithm, the resource allocation system configured to perform acts comprising:
   identifying a plurality of subgraphs of a neural algorithm graph, the neural algorithm graph representative of operations of the neural network algorithm; and
   assigning execution of the subgraphs to a first group of neuron circuits in the neuron circuits, wherein the first group of neuron circuits executes the subgraphs serially, wherein execution of each of the subgraphs results in generation of output data, the first group of neuron circuits configured to provide the output data for each of the subgraphs to a second group of neuron circuits in the neuron circuits, wherein the neuron circuits are configured such that the second group of neuron circuits receives the output data for each of the subgraphs at a same time, the second group of neuron circuits configured to perform one or more processing operations based upon the output data.

2. The neuromorphic computing system of claim 1, each of the neuron circuits comprising a respective time-delay buffer, wherein the first group of neuron circuits output first output data for a first subgraph in the subgraphs to the time-delay buffers of the second group of neuron circuits at a first time, and wherein the first group of neuron circuits output second output data for a second subgraph in the subgraphs to the time-delay buffers of the second group of neuron circuits at a second time, wherein the time-delay buffers of the second group of neuron circuits are configured to provide the first output data and the second output data to the neuron circuits in the second group at the same time.

3. The neuromorphic computing system of claim 1, each of the neuron circuits comprising a respective time-delay buffer, wherein the first group of neuron circuits output first output data for a first subgraph in the subgraphs to their respective time-delay buffers at a first time, and wherein the first group of neuron circuits output second output data for a second subgraph in the subgraphs to their respective time-delay buffers at a second time, and wherein further the time-delay buffers of the first group of neuron circuits output the first output data and the second output data to the neuron circuits in the second group at the same time.

4. The neuromorphic computing system of claim 1, wherein the resource allocation system maintains a routing table, the routing table indicative of synapse connections between neuron circuits in the neuromorphic computing system, wherein the resource allocation system assigns the execution of the subgraphs to the first group of neuron circuits based upon the routing table.

5. The neuromorphic computing system of claim 1, wherein the synapse connections are configurable.

6. The neuromorphic computing system of claim 5, wherein responsive to the first group of neuron circuits executing a first subgraph in the subgraphs, the resource allocation system reconfigures at least one synapse connection in the synapse connections.

7. The neuromorphic computing system of claim 5, wherein responsive to a first synapse connection in the synapse connections being reconfigured, a first neuron circuit and a second neuron circuit in the neuron circuits reset respective state values, the state values being distinct from synapse connections of the first neuron circuit and the second neuron circuit, wherein the first neuron circuit and the second neuron circuit were connected by the first synapse connection prior to the first synapse connection being reconfigured.

8. The neuromorphic computing system of claim 5, wherein responsive to a first synapse connection in the synapse connections being reconfigured, a first neuron circuit in the neuron circuits maintains its state value, wherein the first neuron circuit is a neuron circuit connected to a second neuron circuit by the first synapse connection prior to the first synapse connection being reconfigured.

9. The neuromorphic computing system of claim 1, the plurality of subgraphs identified based upon a number of available neuron circuits in the neuron circuits.

10. A method for allocating computing resources for execution of a neural network algorithm by way of a neuromorphic computing system, the neuromorphic computing system comprising a configurable neural architecture that comprises neuron circuits and synapse connections connecting the neuron circuits, the method comprising:
- decomposing a neural algorithm graph of the neural network algorithm into a plurality of subgraphs;
- generating output data for each of the plurality of subgraphs based upon executing the plurality of subgraphs sequentially by way of a neuromorphic computing system, the output data for each of the subgraphs including respective timing data that is indicative of a delay time associated with the output data for the subgraph;
- receiving the output data for each of the subgraphs at one or more output neuron circuits of the neuromorphic computing system;
- performing, by way of the one or more output neuron circuits, a processing operation over the output data based upon the timing data to generate results data; and
- outputting the results data by way of the one or more output neuron circuits based upon the output data received at the one or more output neuron circuits.

11. The method of claim 10, wherein the output data is generated by the output neuron circuits of the neuromorphic computing system.

12. The method of claim 10, wherein the output data is generated by a second group of neuron circuits.

13. The method of claim 10, wherein the decomposing the neural algorithm graph into the plurality of subgraphs is based upon a number of available neuron circuits in the neuromorphic computing system.

14. The method of claim 10, wherein generating the output data for each of the plurality of subgraphs comprises:
- generating first output data for a first subgraph in the subgraphs by way of a first neuron circuit at a first time, the first output data including first timing data that is indicative of a first delay time;
- providing a control input signal to the configurable neural architecture, the control input signal configured to reconfigure synapse connections of the configurable neural architecture;
- generating second output data for a second subgraph in the subgraphs by way of the first neuron circuit at a second time, the second output data including second timing data that is indicative of a second delay time.

15. A method for executing a neural algorithm by way of a neuromorphic computing system that comprises neuron circuits and synapse connections that connect the neuron circuits, the method comprising:
- identifying a plurality of subgraphs of a neural algorithm;
- generating first output data based upon executing a first subgraph in the subgraphs by way of an input group of neuron circuits at a first time, the first output data associated with a first output delay time;
- generating second output data based upon executing a second subgraph in the subgraphs by way of the input group of neurons at a second time, the second output data associated with a second output delay time;
- receiving the first output data and the second output data at an output group of neuron circuits at a same time; and
- outputting results data by way of the output group of neuron circuits, the results data based upon the receiving the first output data and the second output data at the same time, the results data being results of execution of the neural algorithm.

16. The method of claim 15, further comprising responsive to generating the first output data, reconfiguring at least one synapse connection in the synapse connections of the neuromorphic computing system.

17. The method of claim 15, wherein the identifying the plurality of subgraphs is based upon a number of neuron circuits in the neuromorphic computing system.

* * * * *